(12) United States Patent
Lan

(10) Patent No.: US 6,567,707 B1
(45) Date of Patent: May 20, 2003

(54) RECORDING MEDIUM OF CNC MACHINE TOOL

(75) Inventor: Huai-Sheng Lan, Taichung (TW)

(73) Assignee: Falcon Machine Tools Co. Ltd., Taichung (TW)

( * ) Notice: Subject to any disclaimer, the term of this patent is extended or adjusted under 35 U.S.C. 154(b) by 0 days.

(21) Appl. No.: 09/309,293

(22) Filed: May 11, 1999

(51) Int. Cl.⁷ ............................................... B05B 19/18
(52) U.S. Cl. ............................ 700/3; 700/178; 700/190
(58) Field of Search ................................ 700/164, 181, 700/2–3, 160, 178–179, 190–191

(56) References Cited

U.S. PATENT DOCUMENTS

| | | | | |
|---|---|---|---|---|
| 4,603,285 A | * | 7/1986 | Matssura et al. ........... 318/578 |
| 4,887,221 A | * | 12/1989 | Davis et al. ................. 700/181 |
| 5,870,306 A | * | 2/1999 | Harada ........................ 700/169 |
| 6,298,474 B1 | * | 10/2001 | Blowers et al. ................. 717/1 |
| 6,397,124 B1 | * | 5/2002 | Lan ............................. 700/185 |

* cited by examiner

Primary Examiner—John Follansbee
Assistant Examiner—Ronald D Hartman, Jr.
(74) Attorney, Agent, or Firm—Browdy and Neimark, P.L.L.C.

(57) ABSTRACT

A recording medium of a CNC machine tool is used for storing a program specifying the operations to be executed by the CNC machine tool. The program comprises a master program and a slave program which can be called by the master program. The master program has a plurality of control instructions and parameters for bringing about signals to control a series of operations to be performed by the CNC machine tool. The slave program is an assembly of a plurality of path describing instructions.

1 Claim, 3 Drawing Sheets

RECORDING MEDIUM OF CNC MACHINE TOOL

FIELD OF THE INVENTION

The present invention relates generally to a CNC (computerized numerical control) machine tool, and more particularly to a recording medium of the CNC machine tool.

BACKGROUND OF THE INVENTION

The old-fashioned machine tool is manually operated and is therefore inefficient at best. The CNC machine, tool is relatively efficient and cost-effective. As illustrated in FIG. 1, the operation of the CNC machine tool calls for the programming of the basic motions of a tool, as well as the moving paths of the tool. The programs are then stored in the memory of a controller which is numerally controlled. The machining operations are performed d by the CNC machine tool in accordance with a specific program in conjunction with the instructions given by the machine operator. In other words, the CNC machine tool is a highly-automated machine. However, the work of programming the operation of the CNC machine tool is tedious and time-consuming. Whenever the CNC machine tool is to work on a new workpiece, a new program is called for.

SUMMARY OF THE INVENTION

The objective of the present invention is therefore to provide a recording medium for keeping a program comprising a master program and a slave program that can be called by the master program. The master program has a plurality of control instructions and parameters for generating the signals to control the operations of a CNC machine tool. The slave program is an assembly of a plurality of path describing instructions. The present invention is intended to simplify the programming of the operations to be performed by the CNC machine tool.

BRIEF DESCRIPTION OF THE DRAWINGS

FIG. 2 shows contents of a master program of a preferred embodiment of the present invention.

FIG. 3 shows contents of a slave program of the preferred embodiment of the present invention.

DETAILED DESCRIPTION OF THE INVENTION

Figure 1:
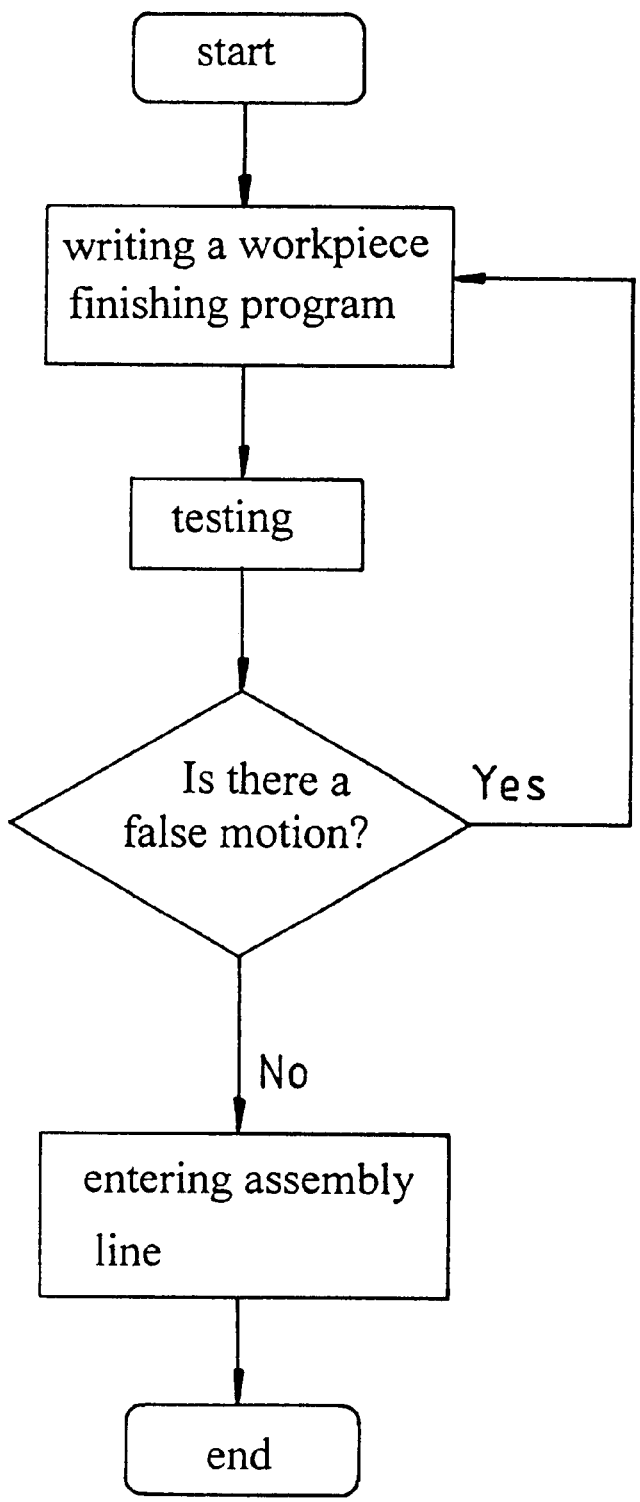
FIG. 1 shows a prior art operational flow chart of a CNC machine tool.

As shown in FIGS. 2 and 3, a recording medium of the preferred embodiment of the present invention is disposed in a controller of a grinding machine. The recording medium stores a master program and a slave program. The master program is a path program comprising a macro-instruction G 207.1, parameters such as B, C, D, F, H, I, P, Y, Z, K, E, and a function instruction M30 for controlling the basic motions of the grinding machine, such as the tool locating, the tool correcting, the profile path executing, the G41 (G42) tool diameter calibrating, etc. The parameters of the master program are denoted as follows:

The first line 0: program code

The second line:
 B: tool advance increment
 C: free pass times between two advances of tool
 D: global variable number of actual tool advance quantity of this finishing, which is to be transmitted back to the called program
 F: finishing advance speed
 H: finishing mode selection (1: finished workpiece; 0: unfinished workpiece)
 I: spark-out times The third line:
 P: path describing program (slave program) number
 Y: Y-axis path starting point coordinate
 Z: Z-axis path starting point coordinate
 K: starting point of tool measurement
 E: Is the path starting point equal to the starting point of tool measurement? (1: yes; 0: no)
 D: tool radius The fourth line M30: end of program The recording medium further comprises a data bank for storing the parameter data corresponding to the master program. This is a prior art technology.

The second line of the master program is used to cause the grinding wheel (not shown in the drawing) of the grinding machine to operate at a preset speed and to advance the tool (F200.0·B0.02). The third line of the master program calls the slave program (P1234) to begin the execution of the path finishing from the present initial point (Y-100.0·Z-50.0).

Figure 4:
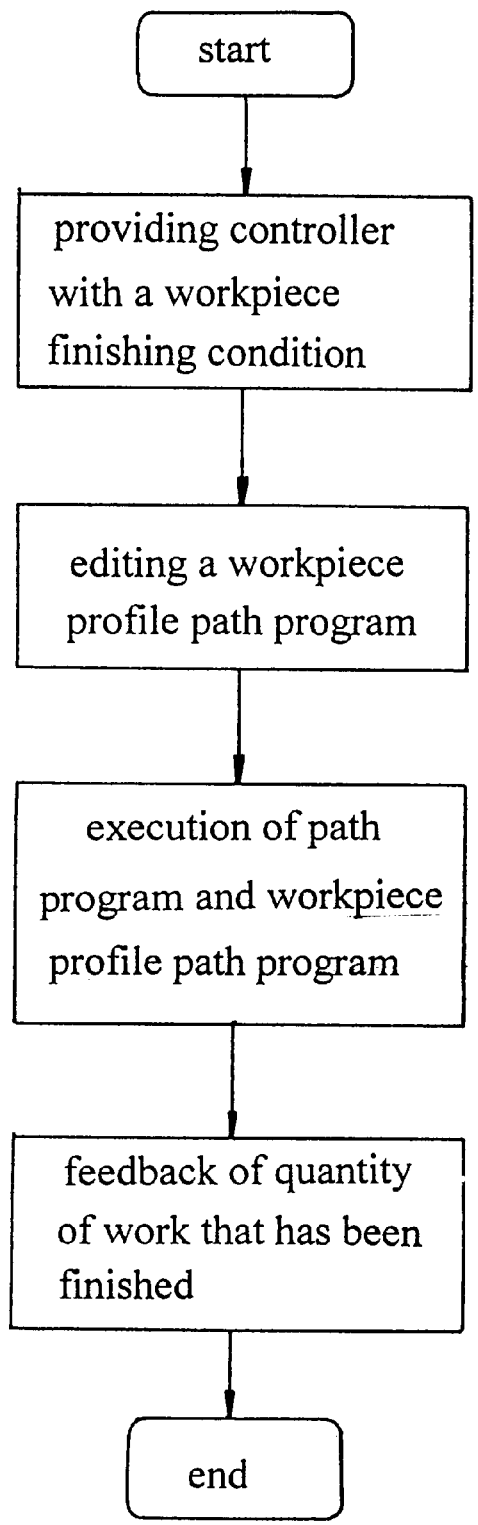
FIG. 4 shows an operational flow chart of the preferred embodiment of the present invention.

The feature of the present invention is that the various basic actions of the machine tool are packaged as a path finishing program (master program), which is then stored in the recording medium. When an engineer is about to write a finishing program for a new workpiece, the engineer is required to write the workpiece path describing instruction (slave program) without having to write the instructions including the basic actions of the machine tool, as illustrated in FIG. 4. The slave program is also stored in the recording medium. Thereafter, the parameters of the master program stored in the recording medium are adjusted. The parameters referred to above are those relevant values of B, C, D, F, H, I, P, etc., which are located after the macroinstruction G207.1. In other words, the speed, the tool advance quantity, the machining times, and various operational modes of the grinding wheel can be adjusted by adjusting the parameters of the master program that is stored in the recording medium. It is therefore readily apparent that the present invention simplifies the programming of the operations to be performed by a machine tool.

What is claimed is:

1. A recording medium of a computerized numerical control machine tool, said recording medium storing a program specifying the operations to be executed by the computerized numerical control machine tool, wherein:

said program comprises a master program and a slave program which can be called by the master program, said master program having a plurality of control instructions and parameters for bringing about signals to control a series of operations to be performed by the computerized numerical control machine tool, said slave program being an assembly of a plurality of path describing instructions;

said recording medium further comprises a data bank for storing data of parameters whereby said data stored in the data bank are called by said master program in such a manner that data are corresponding to each of the parameters; and said data bank stores parameter data of tool advancement increment, free pass time between two advances of the tool, number of actual tool advances, advance speed of tool, and spark-out times.

* * * * *